United States Patent
Evanitsky

(10) Patent No.: US 9,031,330 B2
(45) Date of Patent: *May 12, 2015

(54) PICTOGRAM AND ISO SYMBOL DECODER SERVICE

(71) Applicant: Xerox Corporation, Norwalk, CT (US)

(72) Inventor: Eugene S. Evanitsky, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/139,841

(22) Filed: Dec. 23, 2013

(65) Prior Publication Data

US 2014/0112586 A1    Apr. 24, 2014

Related U.S. Application Data

(63) Continuation of application No. 12/535,242, filed on Aug. 4, 2009, now Pat. No. 8,682,082.

(51) Int. Cl.
*G06K 9/68* (2006.01)
*G06K 9/62* (2006.01)
*G06F 17/30* (2006.01)

(52) U.S. Cl.
CPC ........ *G06K 9/6202* (2013.01); *G06F 17/30247* (2013.01); *G06F 17/30265* (2013.01); *G06K 9/6807* (2013.01)

(58) Field of Classification Search
CPC ................. G06F 17/30247; G06F 17/30265
USPC ........... 382/218, 209, 100, 232, 217; 380/51, 380/54
See application file for complete search history.

(56) References Cited

U.S. PATENT DOCUMENTS

| | | | |
|---|---|---|---|
| 5,802,492 A | 9/1998 | DeLorme et al. | |
| 6,556,692 B1 | 4/2003 | Gavrila | |
| 7,450,759 B2 | 11/2008 | Kudoh | |
| 7,508,954 B2 | 3/2009 | Lev | |
| 7,957,596 B2 | 6/2011 | Ofek et al. | |
| 2002/0044690 A1 | 4/2002 | Burgess | |
| 2005/0015370 A1* | 1/2005 | Stavely et al. | 707/6 |

* cited by examiner

*Primary Examiner* — Mike Rahmjoo
(74) *Attorney, Agent, or Firm* — Ronald E. Prass, Jr.; Prass LLP

(57) ABSTRACT

This invention provides an instantaneous method for a user or traveler to obtain a meaning of a symbol that is unfamiliar to said user. The symbol is captured in a format that is easily transmitted to a remote database server. Together with the symbol, the GPS coordinates of the location of the symbol must be sent to the server. The server performs an image matching search, and then uses the location information (GPS) to resolve multiple matches and to determine the meaning of the symbol and instantaneously transmits in the language of their choice the meaning to the user requesting the search.

15 Claims, 1 Drawing Sheet

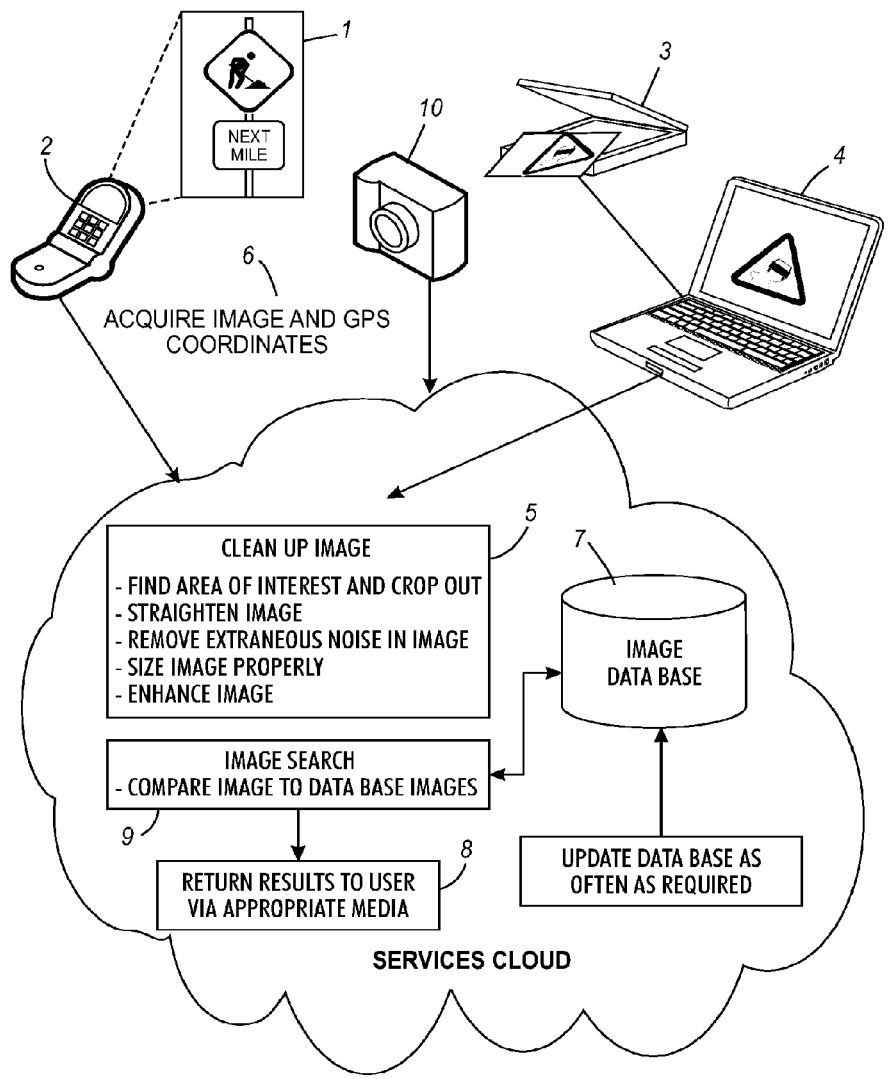

PICTOGRAM AND ISO SYMBOL DECODER SERVICE

RELATED APPLICATIONS

This application is a Continuation Application of U.S. patent application Ser. No. 12/535,242, filed Aug. 4, 2009, and issued as U.S. Pat. No. 8,682,082 on Mar. 25, 2014, the disclosure of which is hereby incorporated by reference herein in its entirety.

FIELD OF DISCLOSURE

This invention relates to a decoder service and more specifically to symbols used in different countries, including pictograms used on roads.

BACKGROUND

Many countries use pictograms in order to avoid language differences. This is especially true of pictograms used on roads to indicate various driving regulations, such as no passing signs, animal crossings, maximum speeds, etc. Various symbols are present on roads, keyboards, phones, cars, and a myriad of other places. They are meant to overcome language differences; however, in several instances they are difficult to understand and may be local in meaning.

With the increase in worldwide tourism and the emerging global market, it is vital that both personal and business visitors have a good grasp on road regulations in various countries and communities around the world. The present invention will provide a vital step in this direction.

Unfortunately, there is no standardization of symbols from country to country, and the tourist or business visitor is often confused as to the meaning intended to be conveyed. Sometimes a misreading of a road symbol can lead to accidents because of a difficulty in interpreting the road signs. While the present invention can be used as a service to indicate meanings of symbols in a multitude of foreign sign areas and situations, for the sake of clarity, the present invention will be described as it relates to symbols on roads relevant to driving on roads in foreign countries.

Since there are no standard road symbols used worldwide, a service that would instantaneously translate the symbols meaning would be extremely beneficial.

A system for recognizing symbols and converting these symbols into a digital format is described in U.S. Pat. No. 7,508,954 B2, but the system described in this patent (Lev) is used primarily for authentication. The invention utilizes an image of a display showing specific information which may be open (that is clear) or encoded. The imaging device captures the image on the display, and a computational facility will interpret the information (including prior decoding of encoded information) to recognize the image. The recognized image will then be used for purposes such as user authentication, access control, expedited processes, security, or location identification.

The present invention differs from LEV in a major difference in that GPS is used to find the correct locality using the symbol and determines its meaning in that locality.

The main thrust of the invention of U.S. Pat. No. 7,508,954 B2 (Lev) is user identification and access. The purpose appears to be to enable secure commerce such as buying over the internet, so the user must be identified from a picture OR a token within the picture must be identifiable; maybe a coupon, a barcode or a badge. Successful identification will allow the transaction to proceed. This is not a general look-up service as in the present invention. The patent to Lev is about analyzing a digital image or video for specific, predetermined symbols or objects. The present invention described herein is the reverse; it deals with general objects and tells what they are. Part of their uniqueness is in the algorithms that do the matching (or rather searching within the image itself). Lev only uses location as part of the authentication process. The present invention must use location to determine the interpretation of the symbol. The Lev patent, the photo taken by the user for authentication represents a proof of the user's location which coupled to the user's phone number create reliable location-identity authentication. Thus, the location is used in Lev only for user authentication.

The location (GPS coordinates) of the present invention is used to determine a meaning of a symbol; for example, the same symbol may have a different meaning in Italy than in Switzerland. Therefore, in the present invention the GPS location of the symbol is critical to the correct search conducted and meaning to be determined. This is completely different than the location use in Lev.

SUMMARY

Symbols are not always easy to interpret and every region of the world seems to use different symbols. Symbols related to driving can be especially confusing and even dangerous if not understood properly. Another area of confusion is pictograms found on machinery or in user manuals. There have recently been some experiences where the proposed invention would have come in handy. While driving in France, a foreign visitor was perplexed by road signs. The GPS that provided directions would indicate a left turn; however a sign indicated that it was illegal. Trouble understanding parking signs and other road sings is common Here are some examples of confusing symbols:

🚫 End of no passing ⊖ No passing zone ⓭ minimum speed
ⓜ maximum speed
🅿 no parking side 1 on odd days; no parking on side 2 on even days.
ⓞ oncoming vehicle priority Another challenge was when a foreign visitor or user needed to replace a fuse in a Volkswagen. It was found that the fuse box had an instruction card, but there were no word descriptions of the symbols and they could not find the fuse; one that was suspected might need changing. Other instances of frustration are trying to understand symbols on machine interfaces, cars dashboards and user manuals.

This invention would use a camera equipped cell phone Wi-Fi camera, or scanner to take a picture of the symbol which would be transmitted, wirelessly, along with the GPS coordinates, to a service that would use the information to look up the symbol in a set of databases and immediately provide the meaning back to the user in a verbal or text format. Wi-Fi cameras have better resolution than cell phone cameras and can automatically transfer an image over a network. There are several appropriate cameras on the market today. Cell phone camera resolutions continue to improve. Some older versions may not be totally adequate for this service but newer versions are usable and future ones will be even better. Originally the phone cameras where 1 megapixel. Many phones today are over 3 megapixels with some as high as 8 megapixels. Likewise, cell phone networks are getting much faster and will continue to do so and will function in the present invention.

This invention relies on the following capabilities:

The decoder service would need a large database of pictures from around the world with images of pictograms, pictographs and iso symbols. The database would need to be capable of being updated on a regular basis as new images are identified. The interpretation of the symbol would be part of the metadata stored with the image. The database may also include metadata that would be useful in interpreting the image. For example, if a user was in France or Germany and I snapped an image of a road sign, the GPS coordinates of my location can be used to differentiate a symbol that has different meanings in different countries. There are many online collections of iso-symbols and road sign images that can be used to create the database(s).

Imaging software that could find the area of the photograph or scan that was of interest and crop everything else out. Many digital cameras come with this capability to identify an area of interest, such as a face, and Xerox has developed software called "FaceFinder" that is used in Xerox imaging center to process photo IDs for credit card applications. It can find the face in the image and then enlarge or shrink the image to the size needed for the credit card. Similarly, in this invention we would need to identify and extract the pictogram image from the photograph or scan. In the case of multiple images, it could recognize and separate multiple pictograms or it can provide a feature to allow the user to select the specific image it needs information on. If the system needed to return the definition of several images then it would have to show the image to the user along with the interpretation to avoid any confusion. Additional image clean up and enhancement would be necessary to center the image, straighten it up, remove noise (salt and pepper clean up), etc.

The service would use an imaging recognition and categorizing software to search the database. There are commercial software packages that can be trained to do this and Xerox has its own software that can be used, i.e., GVC (Generic visual categorizer) and/or DICE (Document image classification engine).

Image acquisition can come from many sources as long as it produces a digital file. Cell phone cameras or regular digital cameras can be used provided that caution is exercised while driving. Paper documents can be scanned in or electronic documents can be submitted to the Decoder service. This application is ideally suited as a service rather than a client application because of the requirement of a large, up to date image library and the sophistication of the software necessary to clean up the images and to perform the image search. The system should also provide a way to research images that could not be found in the database so that it can be updated.

A novelty of this invention is in construction of the database of symbols and in the application of existing technologies in image processing and visual search to a practical problem and in the creation of a service that real people can access in a simple manner using commonly available equipment such as network connected cell phones and laptop computers.

All of the image processing software is available and in use as is the visual categorization and search software. It would need to be trained with an appropriate image set. The database has not been created but there are many different on line collections of pictograms and iso-symbols. It would require work to generate but the information is available.

There is some work being conducted today that could be used in establishing the database of this invention for example the UCSC Center for Research in Language is engaged in a large international study to provide an index of symbols in several different languages—American, English, German, Mexican, Spanish, Italian, Bulgarian, and Hungarian. A publication ISO7001 (Public information symbols) is a standard published by the International Organization for Standardization that defines a set of pictograms and symbols for public information. A latest version of this publication is ISO7001: 2007, November 2007. This effort, while helpful, is concerned with standardizing various symbols; this would 'not be necessary with the development of the database of the present invention.

The present invention leverages some existing services business infrastructure and the imaging technology that has been developed. There is a lot of work being done in visual search technologies but most are taking a specific word and searching for images based on that work. Shahi (http://blachan.com/shahil) is a visual dictionary that combines Wiktionary content with Flickr images, and more) and others are used to automatically categorize photos based on what is in the photo (Viewzi; SearchMe; uvLayer and oSkope). There is no known specific tool that analyzes and interprets pictograms or iso-symbols. The advantages of having this invention should be clear. Even if one had a hard copy reference guide, there is no simple way to index the guide to find an arbitrary image. This type of search, of an image against and image database is best handled by computers. Being able to have this type of information when traveling has implications on safety, avoiding costly mistakes and general frustration. There are no technical obstacles to the present invention to solving this problem, it is a matter of collecting the right master data set, training the tools to the data set and setting up the interface using internet technology.

BRIEF DESCRIPTION OF THE DRAWINGS

FIG. 1 is a flow chart illustrating the steps in an embodiment of this invention.

DETAILED DESCRIPTION

In FIG. 1 a pictogram decoding service is provided using your cell phone camera, wi-fi camera, scanner or a computer file as input. Take a picture of the symbol and select the decode service which may reside somewhere on the internet. The service utilizes the image and your GPS coordinates to determine the meaning of the symbol which it can provide to you as a text message or a verbal response. The GPS coordinates is a critical part of the present process and invention, because without it, the meaning in that locality cannot be determined.

In FIG. 1 an outline of the steps in the present process are illustrated. A symbol 1 that is confusing is photographed or imaged by a cell phone 2, digital camera 10, scanner 3 or computer 4, the image taken is improved to the extent possible by the steps of clean up image 5. The GPS coordinates 6 of the location of the symbol 1 is determined, and the cleaned up image 5 and the GPS 6 are forwarded to a database server 7. The database server 7 compares and searches at 9 the image 5 conveyed within the GPS 6 location and as soon as possible within seconds returns results to the user as shown at 8. If the response to the results of the search is not within about 10-15 seconds, the usefulness of this process is reduced. This response is defined as "a short time" in the claims. Usually the response could be in the form of a call to the user cell phone, or a text message to the user on the meaning of the symbol. Without the searcher's knowledge of the GPS coordinates, the search of symbol meaning within that specific area would be meaningless.

Therefore, in summary, the two critical features to be in the present invention are:

1. The proper database that can isolate and identify your symbol for review;

2. The GPS coordinate where the photo of the symbol was taken to get a match on the symbol. An immediate verbal or oral response via phone is preferred. Without either of these criteria the process of the preset invention will not function.

This invention provides a method of identifying symbols including traffic pictograms which comprises a user capturing the image or symbol to be identified by an imaging device selected from the group consisting of cell phone camera, digital camera, wi-fi camera, scanner or computer file then transmitting this information to a database server including the image from the imaging device and user's GPS location where the symbol exists to obtain the local meaning of the symbol.

The server will process the information that was transmitted including the image or symbol and the user's location re GPS coordinates for the server to determine a meaning of the symbol within the location where the user captured the image.

The server will compare the symbol imaged that was transmitted with symbols in the GPS indicated location in order for the server to determine the meaning of the symbol and subsequently transmit from the database server to the user the meaning of the symbol in the location identified by the GPS. The image may be cleaned up to be clearer prior to transmission by the user to the database server. The database server utilizes image recognitions and categorizing software and the GPS to search in the database.

In some cases, images that are not present in the database server will be added to the database to update the database for enhanced future usage. The database comprises a collection of pictograms and iso-symbols each existing with precise meanings within various locations identifiable by GPS coordinates. The image acquisition is produced in digital format for searching in the database. This should have a Wikipedia-like interface so that users can edit the definitions to improve their accuracy or to identify symbols that the system is not familiar with. The system should be able to accept verbal or audio input to add to the database. Also, the database must be multilingual so that the service is available worldwide.

The database has symbols categorized by the GPS locations where they exist and the GPS locations are matched with a requested search to determine symbol meaning. The database server in one embodiment is configured to respond to the user in a short time via oral communication to a user cell phone. This is meant to be a general purpose symbol decoder, not just for road signs. Other symbols could be found on product packaging, or within documentation. Electrical symbols, construction diagram symbols, or even hieroglyphics or heraldic symbols.

It will be appreciated that variations of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of identifying symbols including traffic pictograms for use with a Global Positioning Satellite (GPS) device, comprising:
receiving image information from an imaging device, the image information including an image and a GPS location at which the image was captured; and
processing the received image information in a database server located geographically remotely from the GPS location at which the image was captured to determine a meaning of the image at the location at which the image was captured,
the processing comprising comparing the image with stored images or symbols in a database in the database server to determine whether the image matches a stored image or symbol in the database, the stored images or symbols including traffic pictograms and being associated with the GPS location at which the image was captured, and
when a match is not determined based on the comparing, storing the image in the database.

2. The method of claim 1, the comparing comprising at least one of (1) comparing an image appearance of the image with a stored image or symbol appearance and (2) comparing the GPS location at which the image was captured with a stored image or symbol GPS location.

3. The method of claim 1, further comprising:
when a match is determined based on the comparing, transmitting from the database server to a user device the determined meaning of the image at the GPS, location at which the image was captured, the meaning being associated with the stored image or symbol determined to match the image.

4. The method of claim 1, the database comprising a collection of pictograms and iso-symbols each existing with precise meanings within various locations identifiable by GPS coordinates.

5. The method of claim 1, the image being a captured digital image.

6. The method of claim 1, the stored images or symbols are in the database being categorized by GPS locations where the stored images or symbols exist.

7. The method of claim 1, the database server being configured to respond to a user via a user's mobile telephone or personal electronic device.

8. A system for determining a meaning of symbols, comprising:
an imaging device that captures an image of a symbol, the imaging device being selected from a group consisting of a cellular telephone camera, a digital camera, a Wi-Fi camera, and a scanner, and including a GPS system;
an image database that stores image data and GPS location data associated with the image data, the image database receiving image data transmitted to the image database from the imaging device, the image data corresponding to the image of the symbol, and captured image GPS location data comprising a GPS location of the imaging device when the image of the symbol was captured, and being derived from the GPS system; and
a processor that is programmed to:
determine a meaning of the image of the symbol based on the image data and the captured image GPS location data, the determining comprising comparing the image data with stored image or symbol data in the image database to determine whether the image data matches an image or symbol stored including a traffic pictogram in the database, or the captured image GPS location matches a location of an image or symbol stored in the image database, and
update the stored image or symbol data in the database to include the image data when it is determined that the image data does not match any image or symbol stored in the image database.

9. The system of claim 8, the image database storing symbol data including at least one of a pictogram and an iso-symbol, and at least one meaning corresponding to the at least one of the pictogram and the iso-symbol.

10. The system of claim 8, the determined meaning being associated with the captured image GPS location data.

11. The system of claim 8, the determining the meaning comprising searching the image database for symbol data based on the captured image GPS location data.

12. The system of claim 8, the processor being further programmed to transmit to a user cellular telephone a determined meaning of the image of the symbol when the image of the symbol is captured by a camera in the user cellular telephone.

13. The system of claim 8, the processor being further programmed to transmit to a user mobile device a determined meaning of the image of the symbol when the image of the symbol is captured by a camera in the user mobile device.

14. The system claim 13, the user mobile device being configured to acquire a GPS position of the user mobile device, and to associate the acquired GPS position with an image captured by the the camera in the user mobile device.

15. The system of claim 8, the image database being geographically remotely located from the imaging device during the determining.

* * * * *